United States Patent
Müller et al.

(10) Patent No.: US 6,624,278 B2
(45) Date of Patent: Sep. 23, 2003

(54) PROCESS FOR PRODUCING THERMALLY STABLE THERMOPLASTIC POLYURETHANES

(75) Inventors: Friedemann Müller, Neuss (DE); Wolfgang Bräuer, Leverkusen (DE); Hans-Georg Hoppe, Leichlingen (DE); Hans-Georg Wussow, Düsseldorf (DE); Hans Wagner, Dormagen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/008,164

(22) Filed: Dec. 3, 2001

(65) Prior Publication Data

US 2002/0107352 A1 Aug. 8, 2002

(30) Foreign Application Priority Data

Dec. 8, 2000 (DE) ......................... 100 61 067

(51) Int. Cl.$^7$ .............................. C08G 18/30
(52) U.S. Cl. .......................... 528/49; 528/85
(58) Field of Search ..................... 528/49, 85

(56) References Cited

U.S. PATENT DOCUMENTS

| 3,718,622 A | 2/1973 | Camilleri et al. ....... 260/75 NP |
| 4,071,505 A | 1/1978 | Meckel et al. ...... 260/77.5 MA |
| 4,098,772 A | 7/1978 | Bonk et al. .................... 528/49 |

FOREIGN PATENT DOCUMENTS

| CA | 2119001 | 9/1994 |
| DE | 24 18 075 | 10/1975 |
| DE | 31 32 760 | 3/1983 |

OTHER PUBLICATIONS

Patent Abstracts of Japan, vol. 017, No. 659 (C–1137) Dec. 7, 1993 & JP 05 214062 A (Toyobo Co. Ltd), Aug. 24, 1993 *Zusammenfassung*.

*Primary Examiner*—Rachel Gorr
(74) *Attorney, Agent, or Firm*—Joseph C. Gil; Aron Preis

(57) ABSTRACT

A continuous process for the production of thermoplastically processable polyurethane elastomer is disclosed. The process comprise adding acid H compounds in an amount calculated to control and render constant the melt viscosity of the product. The inventive elastomer has constant melt flow behavior and high thermal stability.

8 Claims, 1 Drawing Sheet

PROCESS FOR PRODUCING THERMALLY STABLE THERMOPLASTIC POLYURETHANES

FIELD OF THE INVENTION

The invention relates to a continuous process for the production of thermoplastically processable polyurethane elastomers having predetermined and constant melt flow and thermal stability.

BACKGROUND OF THE INVENTION

Thermoplastic polyurethane elastomers (TPU) have long been known. They are important industrially owing to the combination of high-quality mechanical properties with the known advantages of inexpensive thermoplastic processability. By using different chemical chain-extension components, it is possible to achieve a wide variety of mechanical properties. An overview of TPUs, their properties and applications is given, for example, in Kunststoffe 68 (1978), pages 819 to 825, or Kautschuk, Gummi, Kunststoffe 35 (1982), pages 568 to 584. TPUs are made up of linear polyols, mostly polyesters or polyethers, organic diisocyanates and short-chained diols (chain-lengthening agents). As with all polyurethane elastomers, they can be constructed either stepwise (prepolymer process) or by the simultaneous reaction of all the components in one step (one shot). In the case of the prepolymer process, an isocyanate-containing prepolymer is formed from the polyol and the diisocyanate and is reacted in a second step with the chain-lengthening agent. This process permits better control of the reaction and better phase separation than does the one shot process. TPUs may be produced continuously or discontinuously. The so-called band process and the extruder process are used as the most well known industrial production processes.

Thermoplastic processability represents a major technical advance over the earlier known processing methods involving casting. However, the production of large molded bodies with complex outlines or the production of molded bodies of small wall thickness causes difficulties to this day, since the high viscosity and limited flowability of the polyurethane melt prevents the mould from being filled completely. In addition, the specialized method of processing by extrusion tolerates an extremely small permissible variation in the melt viscosity. Attempts have therefore been made to achieve low viscosity of the thermoplastic by increasing the processing temperatures. This led, however, to burning or decomposition of the material, which is noticeable as blisters, shrinkage, streaks or tackiness.

The processes that reduce the melt viscosity (U.S. Pat. No. 4,071,505, DOS 24 18 075) or the gel content (U.S. Pat. No. 3,718,622) by addition of so-called chain terminators, such as, for example, mono-functional alcohols, represented an advance. A disadvantage of those processes is, on the one hand, that it is not possible in practice to establish a reproducibly defined viscosity. In fact, small amounts of such chain terminators have a considerable effect on the viscosity. Since, however, the amount of reactive impurities in the raw materials (e.g. in the polyol; different polyol quality batches are used) that are used is not constant, different viscosities, which exceed the tolerance limits of the processing, are obtained time after time according to the above specifications, with the same formulation and with a constant amount of chain terminator in each case, owing to different polymer conversions.

Furthermore, when polyurethanes are produced with an NCO/OH ratio of about 1, a particular viscosity is always obtained at least two different isocyanate concentrations. The melt viscosity at the higher isocyanate concentration (isocyanate excess) is achieved by a proportion of linear polyurethane and a proportion of crosslinked polyurethane. That melt viscosity is not suitable for the above-described difficult processing on account of the crosslinkages, some of which are not thermally stable. The melt viscosity to be strived for is that which is based only on the linear polyurethane, that melt viscosity being obtained with the lower amount of isocyanate.

In the case of the products produced by the processes known hitherto, it is not possible to differentiate between those viscosities during continuous production owing to the above-mentioned changes in the impurities in the raw materials. That leads to an unacceptable degree of uncertainty in production.

The object was, therefore, to seek an economical and operationally suitable process with which a thermoplastically processable polyurethane elastomer having defined and standardized (constant) melt flow behavior (constant viscosity) can be produced.

DETAILED DESCRIPTION OF THE INVENTION

Surprisingly, there has now been found a continuous process for the production of thermoplastically processable polyurethane elastomers having improved properties. These elastomers, that are the reaction products of a reaction mixture comprising at least one substantially linear hydroxyl-terminated polyol having a number average molecular weight of from 600 to 5000, at least one organic diisocyanate, and a difunctional and/or trifunctional hydroxyl containing chain-lengthening agents having a molecular weight of from 62 to 500, are characterized in having a substantially constant melt flow (expressed as a substantially constant viscosity) and high thermal stability. The reaction mixture is characterized in that its overall NCO/OH ratio, adding all the reaction components (including the acid H compounds), of from 0.9:1 to 1.2:1. The process is characterized in that, in the start-up phase of the continuous production, the required added amount of organic diisocyanates for establishing the maximum viscosity of the melt of the polyurethane elastomer, preferably measured as the pressure build-up in front of a capillary having a defined temperature, is determined, the added amount of organic diisocyanates so determined is then added in a constant manner during the continuous production of the polyurethane elastomer and, by the additional and preferred simultaneous addition (preferably simultaneous with the addition of the chain lengthening agent) of relatively small amounts of from 0.3 to 6 mol. %, based on the chain-lengthening agents, of acid H compounds, preferably monofunctional acid H compounds, the viscosity of the melt of the polyurethane elastomer is adjusted to a constant value of <90% of the previously determined maximum viscosity. Start-up phase means the beginning of the continuous process during which the amounts of the feeding streams are determined and adjusted.

It is possible in the process according to the invention to add up to 2 wt. % less organic diisocyanate than determined in the start-up phase, in order thus to obtain thermoplastically processable polyurethane elastomers having very particularly low melt viscosities.

Preferred polyols are polyesters, polyethers, polycarbonates or a mixture thereof.

Suitable polyether polyols may be prepared by reacting one or more alkylene oxides having from 2 to 4 carbon atoms in the alkylene radical with a starter molecule containing two active hydrogen atoms bonded therein. The following may be mentioned as examples of alkylene oxides: ethylene oxide, 1,2-propylene oxide, epichlorohydrin and 1,2- and 2,3-butylene oxide. Preference is given to the use of ethylene oxide, propylene oxide and mixtures of 1,2-propylene oxide and ethylene oxide. The alkylene oxides may be used individually, alternately in succession, or in the form of mixtures. Starter molecules include, for example: water, amino alcohols, such as N-alkyldiethanolamines, for example N-methyl-diethanolamine, and diols, such as ethylene glycol, 1,3-propylene glycol, 1,4-butanediol and 1,6-hexanediol. It is also possible to use mixtures of starter molecules. Suitable polyether polyols are also the hydroxyl-group-containing polymerization products of tetrahydrofuran.

It is also possible to use trifunctional polyether polyols in amounts of from 0 to 30 wt. %, based on the bifunctional polyether polyols.

The substantially linear polyether polyols preferably have molecular weights of from 600 to 5000. They may be used either individually or in the form of mixtures with one another.

Figure 1:
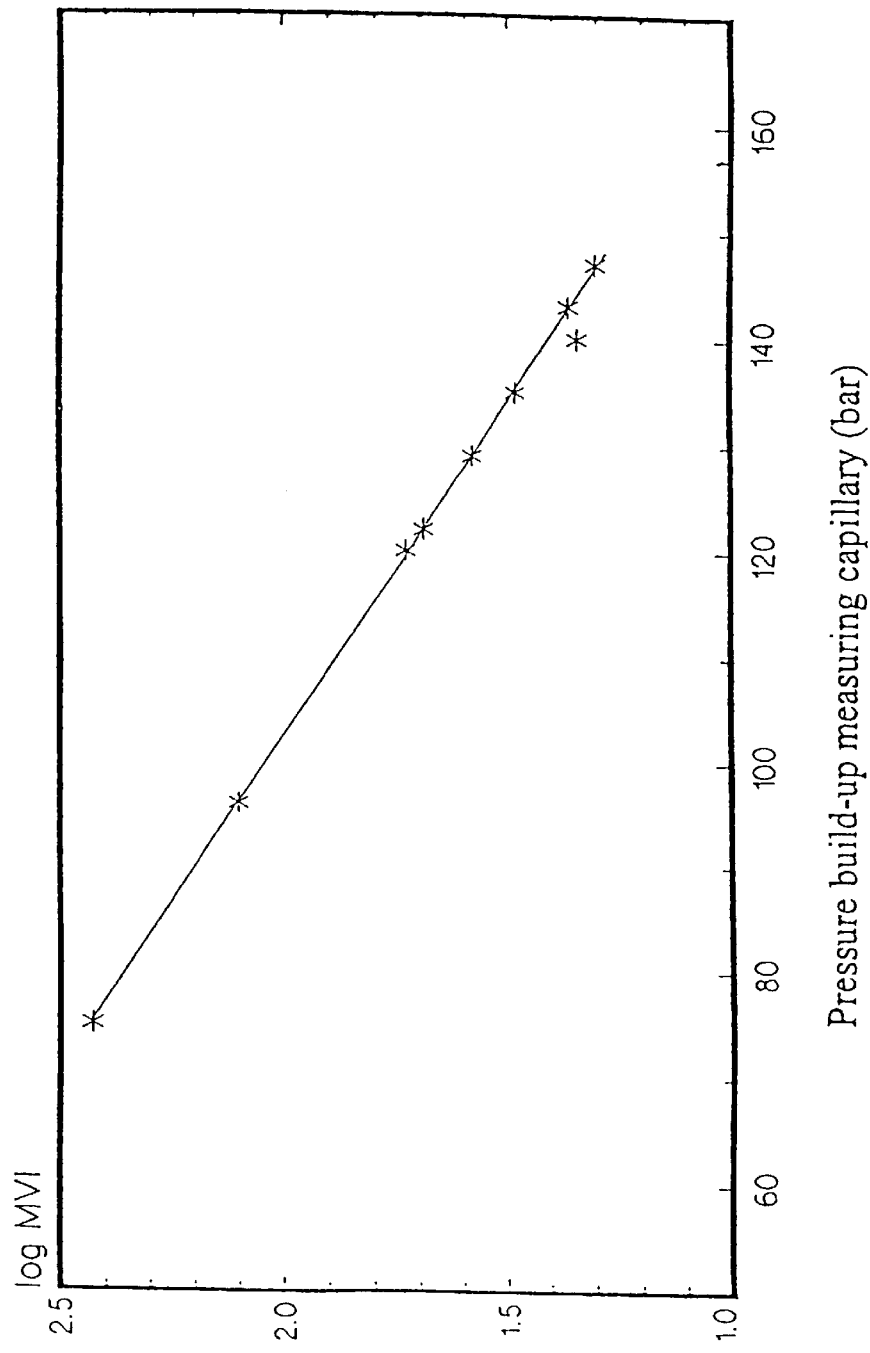
FIG. 1 shows the correlation of the measured melt pressure with the melt viscosity (MVI) according to DIN 53 375.

Suitable polyester polyols may be prepared, for example, from dicarboxylic acids having from 2 to 12 carbon atoms, preferably from 4 to 6 carbon atoms, and polyhydric alcohols. Suitable dicarboxylic acids include, for example: aliphatic dicarboxylic acids, such as succinic acid, glutaric acid, adipic acid, suberic acid, azelaic acid and sebacic acid, and aromatic dicarboxylic acids, such as phthalic acid, isophthalic acid and terephthalic acid. The dicarboxylic acids may be used individually or in the form of mixtures, for example in the form of a succinic, glutaric and adipic acid mixture. It may be advantageous for the preparation of the polyester polyols to use instead of the dicarboxylic acids the corresponding dicarboxylic acid derivatives, such as carboxylic acid diesters having from 1 to 4 carbon atoms in the alcohol radical, carboxylic acid anhydrides or carboxylic acid chlorides. Examples of polyhydric alcohols are glycols having from 2 to 10, preferably from 2 to 6, carbon atoms, such as ethylene glycol, diethylene glycol, 1,4-butanediol, 1,5-pentanediol, 1,6-hexanediol, 1,10-decanediol, 2,2-dimethyl-1,3-propanediol, 1,3-propanediol and dipropylene glycol. According to the desired properties, the polyhydric alcohols may be used alone or, optionally, in admixture with one another. Also suitable are esters of carbonic acid with the mentioned diols, especially those having from 4 to 6 carbon atoms, such as 1,4-butanediol and/or 1,6-hexanediol, condensation products of ($\omega$-hydroxycarboxylic acids, for example $\omega$-hydroxycaproic acid, and preferably polymerization products of lactones, for example optionally substituted ($\epsilon$-caprolactones. There are preferably used as polyester polyols ethanediol polyadipate, 1,4-butanediol polyadipate, ethanediol-1,4-butanediol polyadipate, 1,6-hexanediol neopentyl glycol polyadipate, 1,6-hexanediol-1,4-butanediol polyadipate and polycaprolactones. The polyester polyols have molecular weights of from 600 to 5000.

Included among the suitable organic diisocyanates are, for example, aliphatic, cycloaliphatic, araliphatic, heterocyclic and aromatic diisocyanates, as are described, for example, in Justus Liebigs Annalen der Chemie, 562, pages 75 to 136.

The following may be mentioned as specific examples: aliphatic diisocyanates, such as hexamethylene diisocyanate, cycloaliphatic diisocyanates, such as isophorone diisocyanate, 1,4-cyclohexane diisocyanate, 1-methyl-2,4- and -2,6-cyclohexane diisocyanate and the corresponding isomeric mixtures, 4,4'-, 2,4'- and 2,2'-dicyclohexylmethane diisocyanate and the corresponding isomeric mixtures, and, preferably, aromatic diisocyanates, such as 2,4-toluylene diisocyanate, mixtures of 2,4- and 2,6-toluylene diisocyanate, 4,4'-, 2,4'- and 2,2'-diphenylmethane diisocyanate, mixtures of 2,4'- and 4,4'-diphenylmethane diisocyanate, urethane-modified liquid 4,4'- and/or 2,4'-diphenylmethane diisocyanates, 4,4'-diisocyanatodiphenylethane-(1,2) and 1,5-naphthylene diisocyanate. Preference is given to the use of 1,6-hexamethylene diisocyanate, isophorone diisocyanate, dicyclohexylmethane diisocyanate, diphenylmethane diisocyanate isomeric mixtures having a 4,4'-diphenylmethane diisocyanate content of greater than 96 wt. %, and especially 4,4'-diphenylmethane diisocyanate and 1,5-naphthylene diisocyanate.

The mentioned diisocyanates may be used together with a polyisocyanate in an amount of up to 15% (based on diisocyanate), but at most in an amount such that an uncrosslinked product forms. Examples are triphenylmethane 4,4',4"-triisocyanate and polyphenyl-polymethylene polyisocyanates.

The chain-lengthening agents are difunctional and/or trifunctional compounds having molecular weights of from 62 to 500 preferably aliphatic diols having from 2 to 14 carbon atoms, such as, for example, ethanediol, 1,6-hexanediol, diethylene glycol, dipropylene glycol and, especially, 1,4-butanediol. Also suitable, however, are diesters of terephthalic acid with glycols having from 2 to 4 carbon atoms, such as, for example, terephthalic acid bis-ethylene glycol or 1,4-butanediol, hydroxy alkylene ethers of hydroquinone, such as, for example, 1,4-di($\beta$-hydroxyethyl)-hydroquinone, (cyclo)aliphatic diamines, such as, for example, isophorone-diamine, ethylenediamine, 1,2-, 1,3-propylene-diamine, N-methyl-1,3-propylene-diamine, N,N'-dimethyl-ethylene-diamine, and aromatic diamines, such as, for example, 2,4- and 2,6-toluylene-diamine, 3,5-diethyl-2,4- and/or -2,6-toluylene-diamine, and primary ortho- di-, tri- and/or tetraalkyl-substituted 4,4'-diaminodiphenyl-methanes. It is also possible to use mixtures of the above-mentioned chain-lengthening agents.

The acid H compounds according to the invention may be monoalcohols or dialcohols. Monoalcohols are preferred. Examples which may be mentioned are butanol, hexanol, octanol, isooctanol, nonyl alcohol, dodecyl alcohol, stearyl alcohol, ethylene glycol monoalkyl ethers, such as, for example, ethylene glycol monomethyl ether, isopropyl alcohol, isobutyl alcohol, tert-pentyl alcohol. Preference is given to primary alcohols such as, for example, hexanol, octanol, stearyl alcohol. Primary and secondary amines, such as, for example, butylamine, hexylamine, stearylamine, dibutylamine and ethylene diamine, are also suitable, however.

For the preparation of the TPUs, the chain-extension components are reacted, optionally in the presence of catalysts, auxiliary substances and/or additives, in such amounts that the equivalence ratio of NCO groups to the sum of all the NCO-reactive groups, especially of the OH groups of the low molecular weight diols/triols and polyols, is from 0.9:1.0 to 1.2:1.0, preferably from 0.95:1.0 to 1.10:1.0. Suitable catalysts, which in particular accelerate the reaction between the NCO groups of the diisocyanates and the hydroxyl groups of the diol components, are the conventional tertiary amines known in the prior art, such as, for example, triethylamine, dimethylcyclohexylamine, N-methylmorpholine, N,N'-dimethyl-piperazine, 2-(dimethylaminoethoxy)-ethanol, diazabicyclo-(2,2,2)-octane and the like, as well as, especially, organometallic compounds such as titanic acid esters, iron compounds, tin compounds, for example tin diacetate, tin dioctate, tin dilaurate or the tindialkyl salts of aliphatic carboxylic acids, such as dibutyltin diacetate, dibutyltin dilaurate or the like. The catalysts are usually used in amounts of from 0.0005 to 0.1 part per 100 parts of polyhydroxy compound. In addition to catalysts, auxiliary substances and/or additives may also be incorporated into the chain-extension components. Examples which may be mentioned are lubricants, anti-blocking agents, inhibitors, stabilizers against hydrolysis, light, heat and discoloration, flameproofing agents, colorings, pigments, inorganic and/or organic fillers and reinforcing agents. Reinforcing agents are especially fibrous reinforcing materials such as, for example, inorganic fibers, which are prepared according to the prior art and may also be provided with a size.

Further details regarding the above-mentioned auxiliary substances and additives will be found in the specialist literature, for example the monograph of J. H. Saunders and K. C. Frisch "High Polymers", Volume XVI, Polyurethane, Parts 1 and 2, Verlag Interscience Publishers 1962 and 1964, or DE-A 29 01 774.

Further additional components that may be incorporated into the TPU are thermoplastics, for example polycarbonates and acrylonitrile-butadiene-styrene terpolymers, especially ABS. Other elastomers, such as, for example, rubber, ethylene-vinyl acetate polymers, styrene-butadiene copolymers and other TPUs, may likewise be used. Also suitable for incorporation are commercially available plasticisers such as, for example, phosphates, phthalates, adipates, sebacates. The TPUs according to the invention are produced continuously. Either the known band process or the extruder process may be used. The components may be metered simultaneously, i.e. one shot, or in succession, i.e. by a prepolymer process. In that case, the prepolymer may be introduced either batchwise or continuously in the first part of the extruder, or it may be prepared in a separate prepolymer apparatus arranged upstream. The extruder process is preferably used, optionally in conjunction with a prepolymer reactor.

According to the invention, using the given formulation of the above-mentioned constituents polyol, isocyanate and chain-lengthening agent, but without the additional acid H compound, the amount of isocyanate at which the melt viscosity is greatest is sought by means of different amounts of isocyanate varied in small metering steps. Those metering steps may be, for example, the theoretically calculated NCO/OH ratios 0.98, 0.99, 1.00, 1.01, 1.02, 1.03, 1.04, which, of course, do not take account of impurities in the raw materials.

Measurement of the melt viscosity of the TPU can be effected by various methods. On the one hand, it is possible discontinuously to take melt samples, which are measured by known methods, such as, for example, rotary viscometer or flow spiral or MVI value (melt volume index) according to DIN 53 735. A preferred method is the continuous measurement of the pressure build-up of the continuously flowing melt from the TPU reaction in front of a capillary, having a defined temperature, that is arranged at the end of the reactor (e.g. of the extruder). In the capillary having a particular diameter and a particular length, the pressure is measured at a given temperature of the melt. The measuring temperature in the heated capillary is preferably in the range from 150° C. to 260° C. The measured melt pressure correlates with the melt viscosity MVI according to DIN 53 375.

The value of the maximum viscosity so determined is dependent, with the same composition of the melt, on the three parameters mentioned above. Its level is insignificant, however, since viscosity curves having the same course are always obtained against the NCO/OH ratio. It is important only that, according to the present invention, the same capillary at the same measuring temperature is used.

After the determination of the maximum melt viscosity by isocyanate variation, the metered amount of an acid H compound (e.g. butanol, hexanol, octanol, stearyl alcohol) is increased stepwise, at that isocyanate amount (e.g. NCO/OH ratio 1.01), until the melt viscosity, preferably measured as the pressure build-up in front of a capillary, falls to a value <90% of the maximum viscosity. The added amount of acid H compound is usually from 0.3 to 6 mol. %, based on the chain-lengthening agent. The amount will vary in dependence on the different raw materials and impurities in the raw materials (e.g. functionality differences, differences in molecular weight, $H_2O$ content; e.g. different polyol quality batches).

The acid H compound may be introduced separately from the other raw materials or alternatively, for example, on metering of the chain-lengthening agent.

With this process according to the invention there is achieved in a reliable manner a defined low melt viscosity on the OH side, which is based mainly on linear TPU molecular weight. Any isocyanate excesses present, which can lead to crosslinkages, are thus "back-titrated". The products produced by the process according to the invention are more thermally stable than those obtained by the known processes, and the homogeneity in the case of extrusion is improved.

With the process according to the invention it is thus possible, in the case of the industrially conventional continuous production of TPU, to react variably to changes in the raw materials (e.g. variations in functionality) and produce products having constant properties. The products so obtained have very good mechanical properties and are suitable especially for the production of complex injection-molded articles, polyurethane films, calendered and powder-slush articles. The process according to the invention is illustrated but not limited by the Examples which follow.

EXAMPLES 1 TO 9

100 parts by weight of a poly-1,4-butanediol adipate having a molecular weight of approximately 2250 (in the form of polyol quality batch A, B or C) and 1 part by weight of 2,2',6,6'-tetraisopropyldiphenylcarbodiimide are brought to 130° C. in a heat exchanger and metered continuously into the first housing of a twin-screw kneader (ZSK 120; Werner/Pfleiderer) by means of a gear pump. Various amounts of diphenylmethane diisocyanate (MDI-liquid) having a temperature of 60° C. and 0.6 part by weight of bis-ethylene-stearyl-amide in the form of a powder are metered into the same housing. 11.0 parts by weight of butanediol heated to 60° C. are pumped into housing 7. The total metered amount is approximately 1100 kg/h. The housing temperatures are from 200° C. to 260° C. The speed of the ZSK is set to 300 rpm. The TPU is extruded in the form of a molten extrudate, cooled in water and granulated. In a melt side-stream that branches off at the end of the ZSK, the respective melt viscosities in bar were measured continuously via the pressure build-up in front of a measuring capillary (length: 52 mm; inside diameter: 2 mm; temperature: 210° C). The maximum melt viscosity was thus achieved at an NCO/OH ratio of 1.015. Following this calibration, various increasing amounts of n-octanol were metered into the butanediol stream at that fixed NCO/OH ratio. The results of the tests on those products are indicated in the table. Examples 1, 2 and 7 are the comparison examples at maximum melt viscosity (*) from various polyester batches. Examples 2 to 6 and 7 to 9 have been carried out using identical raw materials in each case. It will clearly be seen that, at the first significant fall in the melt viscosity in each case, i.e. <90% of the maximum melt viscosity, in a production series, a product is obtained that is markedly improved in terms of its processing behavior to a blown film. That is achieved in both series on the basis of different raw material batches with different amounts of octanol (Examples 4 and 9). By the process according to the invention there is obtained a melt that flows readily in the extruder and that can be processed to a stable and homogeneous film. In addition, the thermal stability is increased.

TABLE

| Ex. | Polyol quality batch | Octanol parts by wt. based on 100 parts by wt. PES | Pressure build-up measuring capillary bar | MVI at 200° C. 10 kg cm³/min | Relative melt viscosity from pressure build-up measuring capillary % | Thermal degradation % | Extrusion behavior blown film Melt/flow behavior Turning moment | Tube stability | Tube homogeneity |
|---|---|---|---|---|---|---|---|---|---|
| 1* | A | 0 | 147 | 20 | 100 | 54 | not readily flowable, very variable | satisfactory | unsatisfactory |
| 2* | B | 0 | 140 | 22 | 100 | 14 | not readily flowable, very variable | satisfactory | satisfactory |
| 3* | B | 0.08 | 135 | 30 | 96 | 14 | not readily flowable, variable | satisfactory | satisfactory |
| 4 | B | 0.16 | 120 | 54 | 86 | 15 | readily flowable, uniform | good | good |
| 5 | B | 0.24 | 96 | 127 | 69 | 12 | readily flowable, uniform | good | good |
| 6 | B | 0.32 | 75 | 272 | 54 | 8 | very fluid, uniform | satisfactory | good |
| 7* | C | 0 | 143 | 23 | 100 | 20 | not readily flowable, very variable | satisfactory | satisfactory |
| 8 | C | 0.16 | 129 | 38 | 90 | 17 | not readily flowable, variable | satisfactory | satisfactory |
| 9 | C | 0.24 | 122 | 49 | 85 | 16 | readily flowable, uniform | good | good |

Polyol quality batch A: 0.018% by weight of water in the polyol
Polyol quality batch B: 0.011% by weight of water in the polyol
Polyol quality batch C: 0.028% by weight of water in the polyol The Examples were carried out using three different polyester batches

| Examples | Polyol batch |
|---|---|
| 1 | A |
| 2–6 | B |
| 7–9 | C | rel. melt viscosity=melt viscosity with octanol, based on comparison example of identical raw materials (without octanol);
thermal degradation=relative solution viscosity (0.4% N-methylpyrrolidone solution, based on solvent; Ubbelohde viscosimeter; 25° C.) after heat treatment in a kneader at 200° C./15 min, based on the initial value.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A Continuous process for producing a thermally stable thermoplastic polyurethane elastomer, comprising:
  A) obtaining a reaction mixture that includes as reactants
    (i) at least one substantially linear hydroxyl-terminated polyols having a number average molecular weight of 600 to 5000, and
    (ii) an amount of at least one organic diisocyanate, and
    (iii) a chain lengthening agent in the form of a diol having a molecular weight of 62 to 500, optionally along with at least one trial,
  wherein NCO to OH ratio of all reactants including acid H compounds is in the range of 0.9:1 to 1.2:1, said amount of diisocyanate established to result in the maximum melt viscosity of the reaction product prepared from (i), (ii) and (iii), and
  B) adding to said reaction mixture at least one acid H compound in an amount of 0.3 to 6 mol. %, relative to the amount of the chain-lengthening agent, sufficient to result in an elastomer having a constant melt viscosity that is at most 90% of said maximum.

2. The process of claim 1, wherein organic diisocyanate is at least one member selected from the group consisting of dicyclohexylmethane diisocyarrate, hexamethylene diisocyanate, isophorone diisocyanate, naphthylene diisocyanate, 4,4'-diprenylmethane diisocyanate.

3. The process of claim 1 wherein substantially linear hydroxyl-terminated polyol is at least one member selected from the group consisting of polyester, polyether and polycarbonate.

4. The process of claim 1 wherein the chain-lengthening agent is at least one member selected from the group consisting of ethylene glycol, butanediol, hexanediol, and 1,4-di-(β-hydroxyethyl)-hydroquinone.

5. The process of claim 4 wherein chain-lengthening agent further contains a triol chain-lengthening agent.

6. The process of claim 1 wherein the acid H compound is a monoalcohol.

7. The process of claim 1 wherein the acid H compound is a member selected from the group consisting of primary amine and secondary amine.

8. The process of claim 1 wherein up to 2 wt. % less than the calculated amount of organic diisocyanates is added in a constant rate.

* * * * *